Figure 3:
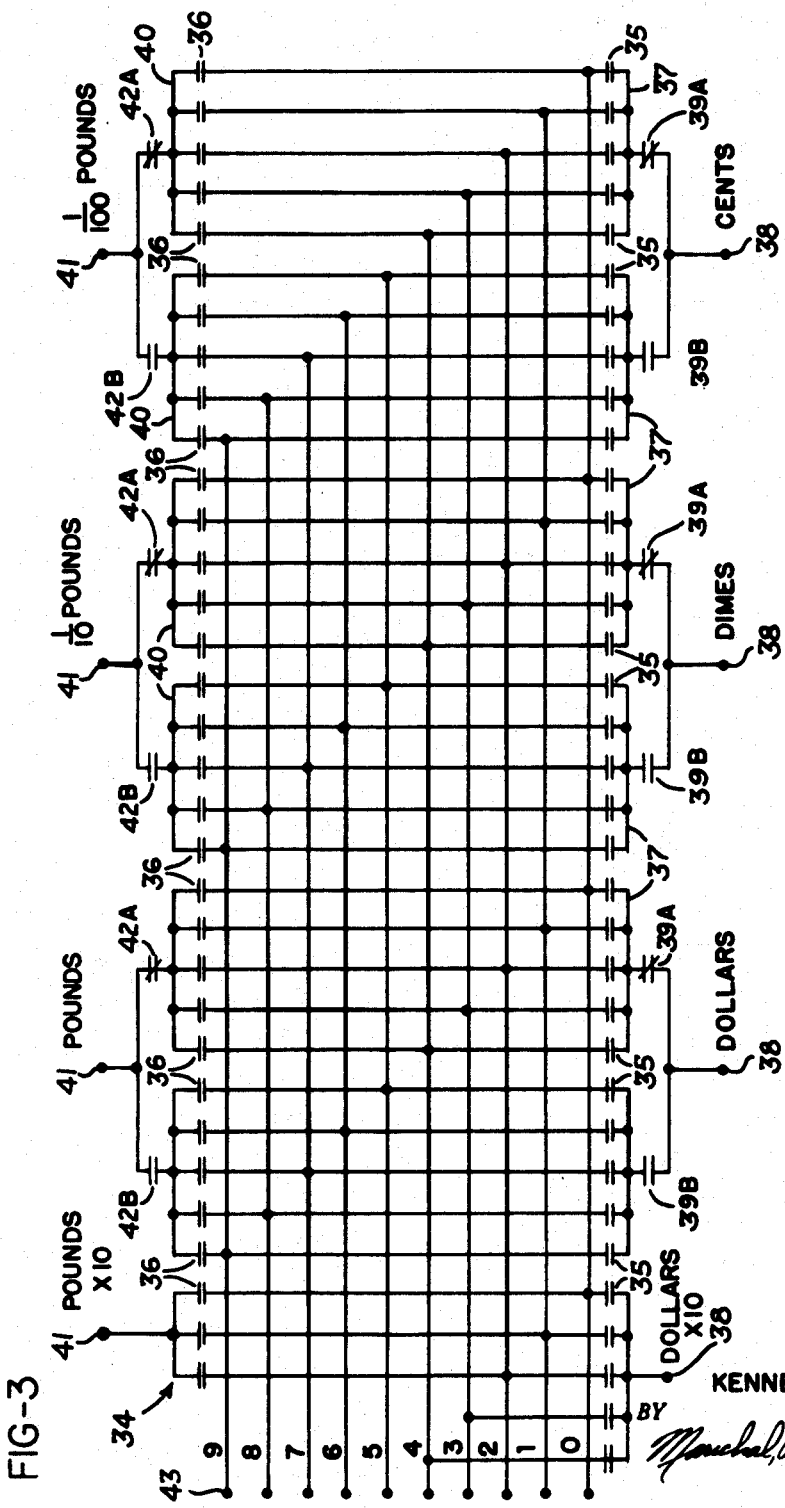

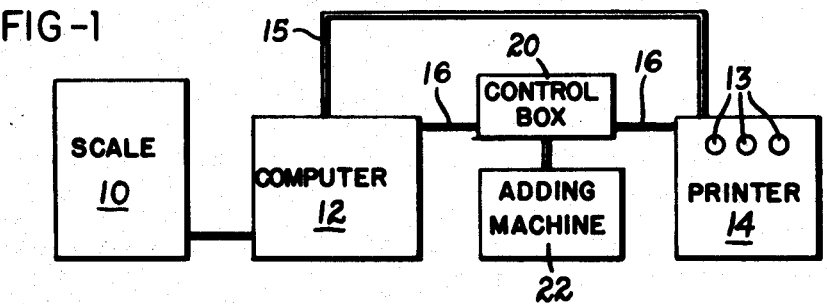
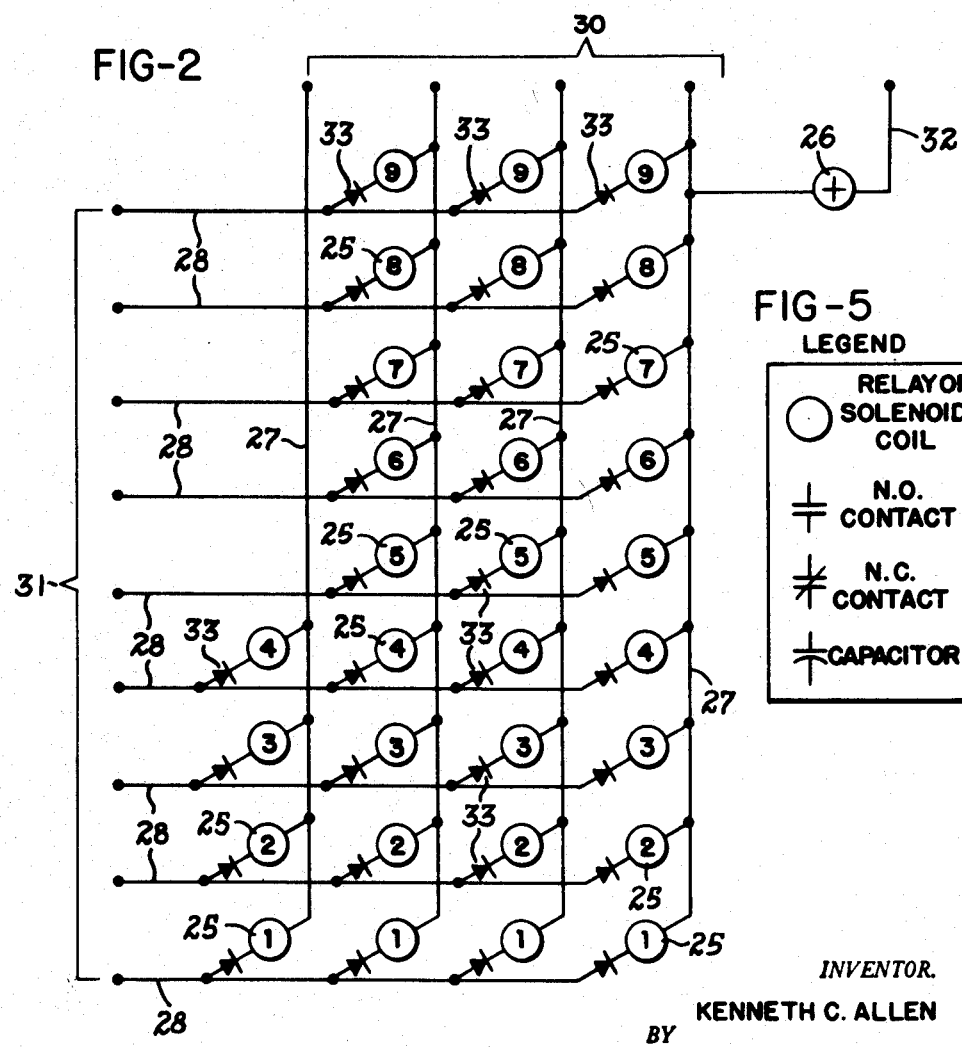
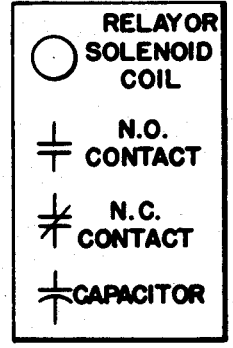

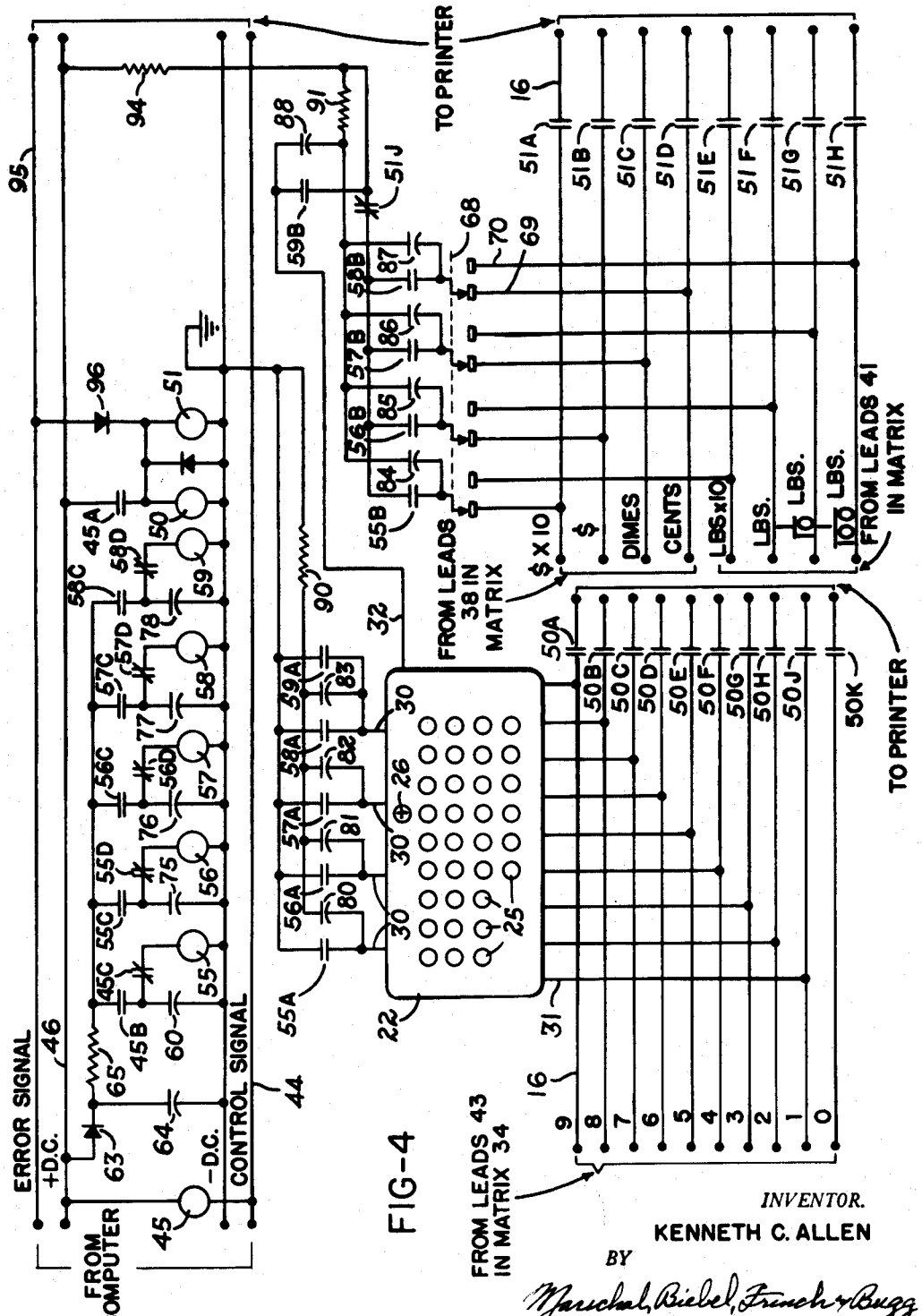

United States Patent Office 3,170,624
Patented Feb. 23, 1965

3,170,624
AUTOMATIC WEIGHING SCALES WITH RECORDING AND TOTALING APPARATUS
Kenneth C. Allen, Dayton, Ohio, assignor to The Hobart Manufacturing Company, Troy, Ohio, a corporation of Ohio
Filed Jan. 20, 1960, Ser. No. 3,624
7 Claims. (Cl. 235—58)

This invention relates to digital storage apparatus and more particularly to apparatus and circuits for reading out and recording stored numerical information.

In my copending application Serial No. 637,725, filed February 1, 1957, now patent No. 3,045,229, issued July 17, 1962, entitled Weighing Scales, there is described an automatic computing scale system which weighs an article or a package, reads out the weight, and computes the product of the weight and the unit price, such as price per pound, to find total cost. The system then issues a printed label including the weight, unit price, and total price or cost. The system of the above invention has found commercial success for the automation of the weighing and pricing operation on many packaged articles. In many cases, it is desirable to form and maintain a running record and total of the individual weights or computed prices over a period of time, such as a day or a week. The present invention relates to apparatus and circuits for reading out computed and stored information, such as price and weight, and for applying this information to an adding machine for storage and totaling.

It is a principal object of this invention to provide apparatus and circuits as outlined above for reading out stored numerical information and applying this information to an adding machine. This numerical information is stored within a storage matrix of closable relay contacts, and is obtained from the matrix by sequentially connecting corresponding adding machine inputs to selected leads of the matrix to effect the energization of appropriate ones of the adding machine inputs corresponding to the stored numerical information.

Another object of this invention is to provide apparatus as outlined above in combination with a computing scale system for reading out computed weight or price information.

A further object of this invention is to provide an electric circuit for reading out a matrix of storage relay contacts with a connected slaved adding machine for making a record and providing a total for a given period of business transaction.

A still further object of this invention is to provide apparatus as outlined above with a circuit using relays arranged for sequentially making circuit paths through the matrix and the adding machine.

Other objects and advantages of the invention will be apparent from the following description, the accompanying drawings and the appended claims.

In the drawings—
FIG. 1 is a block diagram of the computing scale system incorporating this invention;
FIG. 2 is an electrical schematic of the interconnection of the adding machine input solenoids;
FIG. 3 is an electrical schematic of the storage matrix;
FIG. 4 is a schematic of the control box; and
FIG. 5 is a table of electrical symbols used in the specification and drawings.

Referring to the drawings, which illustrate a preferred embodiment of the invention, the computing scale system embodying this invention is illustrated in FIG. 1 as including a power operated weighing scale 10. The weight of the article being weighed, such as the weight of prepackaged meat or produce, is supplied by the scale 10 to a computer 12. Price information, such as the unit price per pound, is set into price knobs 13 of a ticket printer 14. This price information is delivered from the printer 14 back to the computer 12 through a cable 15 where the product of the unit price and weight is obtained to give the total cost. This total cost is then delivered from the computer 12 to the printer 14 through a cable 16 for the purpose of setting up the type wheels within the printer 14 and issuing a printed ticket or label indicating the total price. The details and operation of the scale 10, computer 12 and printer 14 are fully described in the above-referenced Allen application and are referenced herein for the purpose of setting an environment for the understanding of this invention.

This invention includes a control box 20 inserted within the cable 16 between the computer 12 and the printer 14. The control box 20 provides continuity between the computer 12 and the printer 14 only for the fractional part of a complete cycle necessary for the transmission of information therebetween, and thereafter it reads out the price or weight information from the computer 12 through a slaved adding machine 22. This results in an adding machine input corresponding to the numerical value of the stored information.

FIG. 2 shows the electrical connection of a plurality of key operating solenoids 25 and an "add" bar solenoid 26 of the adding machine 22. One solenoid 25 is provided for each of the adding machine keys which are to be operated by this invention. In the embodiment illustrated, provision is made for effecting an input corresponding to any one of the digits 1 through 9 for the first three columns (hundredths, tenths, and units) of the adding machine by the solenoids 25, and for the first four digits of the fourth "tens" column, thereby providing for a maximum input of $49.99, which can be increased as desired by the addition of more solenoids. The keys of the adding machine, here represented by the solenoids 25, are interconnected by column wires 27 according to the columns, or the powers of ten, of the digits. In addition, all similar digits are connected by digit wires 28, thereby forming a matrix with four column inputs indicated at 30 and nine digit inputs indicated at 31. A separate input lead 32 is supplied for the add bar solenoid 26. The individual solenoids 25 are isolated from each other by means of the isolation diodes 33, one diode being connected in series with each of the solenoid coils 25.

The arrangement of the solenoids 25 of the adding machine 22 is complemented by the arrangement of a storage matrix 34 (FIG. 3) within the computer 12. The matrix 34 consists of a plurality of interconnected relay contacts 35 and 36 of storage relays located within the computer 12 and the closed ones of the contacts 35, 36 represent computed and stored cost and weight of an article placed on the scale 10. The relay contacts 35, 36 are grouped according to their function and power, and are interconnected according to common digital values, as follows. The closeable relay storage contacts 35 each represent individual digital values of the computed price and are interconnected in common to form groups 37 of five contacts according to the quinary partial product computing system of the above referenced application. Accordingly, each group 37 either represents individual digits zero through four, or five through nine (5 add 0; 5 add 1; . . . 5 add 4) at a given power of ten. The groups 37 are connected into columns 38 according to the powers of ten of the individual digits through the front and back contacts 39A and B of an "add five" relay. As fully explained in the copending application, the appropriate one of the contacts 39A or 39B is closed depending upon whether the digit to be stored within the matrix 34 lies in the range of zero to four or in the range of five to nine. The operation of the "add five" relay contacts 39 is simultaneous with the closure of the appropriate digit contacts 35 or 36.

The column leads 38 represent the powers of ten of the stored digits. For example, the first column lead 38, connecting two groups 36 of contacts 35, represents the cents, of the computed cost. Similarly, the second column lead 38 represents dimes, the third dollars, and the fourth tens of dollars. In the case of tens of dollars lead 38, provision is made for only a single group 36 of five contacts corresponding to the capacity of the scale 10 and the computer 12. Accordingly, no "add five" contacts 39 are required.

The storage contacts 36, representing the digital value of the computed weight of the article, are also arranged in corresponding quinary groups 40 and connected with common column leads 41 through "add five" relay contacts 42A and B. The leads 41 represent the digital value of the weight in tens of pounds, pound, tenths of pounds, and hundredths of pounds. Each of the digit contacts 36 is interconnected with its corresponding digit contact 35, and with corresponding contacts in each column to form the matrix 34 with common output digit leads 43 representing zero through nine.

Since the internal relay elements and circuit components of the computer 12, of which the matrix 34 is a part, are arranged to close the individual contacts 35, 36, 39 and 42 according to the computed price and weight, a weight of 3.20 pounds at a price of 80¢ per pound results in the closure of the number zero contact 36 in the hundredths of pound group, the number two contact in the tenths of pounds groups, the number three contact in the pounds group, and the number zero contact in the tens of pounds group. In this example, the product or price is $2.56. Therefore, the number 6 contact in the cents column (5+1), the number five contact in the dimes column, the number two contact in the dollars column and the number zero contact in the tens of dollars column will each be closed.

The information thus contained and stored in the matrix 34 of the computer 12 is applied by the cables 16 and the control box 20 to the printer 14 for setting up the type wheels preparatory to the printing of a label or ticket. The computer indicates that it has completed its computation and is ready for the printing cycle by applying a negative D.C. voltage, or a ground, to a control wire 44 running between the printer and the computer. The control box 20 is connected with the control wire 44 and uses the signal applied thereto to connect the column leads 38 or 41 and the digit leads 43 from the matrix 34 to the printer 14 as follows: The signal on the control line 44 causes the energization of a relay 45 connected between a D.C. voltage lead 46 and the control line 44. The operation of the relay 45 closes the contacts 45A in series with a pair of parallel connected relays 50 and 51. The relay 50 has normally open contacts 50A through 50K in the digit leads 43, and the relay 51 has normally open contacts 51A through 51H in the column leads 38 and 41. These contacts of relays 50 and 51 are thus closed by the energization of the relay 45 to complete the direct connection between the computer 12 and the printer 14.

The negative or ground signal from the computer 14 remains supplied to the control line 44 during approximately ¼ of the printer's cycle of operation, or until the printer has set up the indexing sectors for its type wheels according to the weight and total price information stored in the matrix 34. The signal from line 44 is then removed while the printer 14 continues the operation of printing and issuing a label. The interruption of this signal causes the opening of the relays 45, 50 and 51, and therefore the opening of the contacts 50A–K and 51A–H. The mechanism and circuits of this invention are now free to read out the stored numerical information in the matrix 34 for the purpose of applying it to the inputs of the adding machine 22 for making a record of this information and for combining it with other transactions to form a total. This operation is designed to take place during the remaining ¾ of a cycle of the printer 14, so that it is finished no later than the issuance of the label.

It will be seen that the digit inputs 31 of the adding machine solenoid coils 25 are directly connected to the corresponding digit leads 43 from the matrix 34. Means for sequentially applying power to the respective column inputs 30 of the adding machine 22 and to the corresponding column leads 38 or 41 of the matrix 34 include the sequencing relays 55 through 59. During the time when the relay 45 was closed by the control signal, its contact 45B was closed and caused a capacitor 60 to charge through a filter network consisting of a diode 63, a filter condenser 64 and a surge-limiting resistor 65. During this time, the relay contact 45C remained open. The release of the relay 45 closes the contact 45C and provides for the application of the now charged capacitor 60 to the first of the sequencing relays 55, thus "firing" or activating the relay 55 for a short time while the capacitor 60 discharges.

The relay 55 has a contact 55A connected to the "tens" column input 30 of the adding machine 22. The contact 55A is closed upon the firing of the relay 55 to connect the solenoids 25 of the "tens" column to ground, or −D.C. At the same time, a second relay contact 55B is closed to apply voltage from the +D.C. line 46 through the "tens" column lead 38 or 41 of the matrix 34 to the digit inputs 31 of the adding machine.

Provision is made for the selection of two modes of operation with a single adding machine 22. The operator may choose to total either the numerical weight information stored within the matrix 34, or the price information. This is accomplished by the connection of a male plug 68 with one of a pair of female receptacles 69 and 70. In the position shown in FIG. 4, the plug 68 is connected to the receptacle 69 which results in sequentially applying the voltage of the line 46 through the column leads 38 of the matrix 34, and therefore the input to the adding machine 22 is price information. The use of the receptacle 70 would result in the application of the stored weight information into the adding machine 22 through the column leads 41. Thus the closing of the contact 55B applies the D.C. voltage of the line 46 to the tens of dollars lead 38. If any one of the four storage contacts 35, representing ten through forty dollars, is closed, a circuit will be completed through the matrix 34 to the appropriate one of the digit leads 43 connected to this contact. This applies a signal to the appropriate one of the solenoids 25 of the adding machine corresponding to the one of the closed contacts. It will be noted in FIG. 4 that the zero digit lead 43 is not used by the adding machine as it is unnecessary to its operation. Therefore, in the example given above of $2.56, no signal as yet would be applied to the adding machine since the product or price is less than $10.

During the time when the relay 55 has been actuated by the capacitor 60, it has effected the charging of a capacitor 75 from the line 46 through its contacts 55C. Upon the release of the relay 55, due to the discharge of the capacitor 60, the charge capacitor 75 is applied to the second sequencing relay 56 through the normally closed contacts 55D. In this manner, each of the relays 55–59 are sequentially operated by capacitors 60 and 75–78. The sequential operation of the relays 55–58 sequentially applies the voltage of the +D.C. line 46, in turn, to the tens, dollars, dimes, and cents column leads 38 of the matrix 34, while simultaneously and sequentially applying the −D.C. to the column inputs 30 of the adding machine 22. The solenoids 25, corresponding to the closed ones of the storage contacts 35 will be actuated to depress the appropriate adding machine keys. Therefore, in the example, the number two solenoid 25 in the dollars column of the adding machine, the number five solenoid in the dimes column, and the number six solenoid in the cents column will be actuated in turn to depress the associated adding machine keys. The closing of the last of the sequencing relays 59 effects the depression of the "add" bar solenoid 26 of the machine 22 through the contacts 59A and B. This causes the numerical information, now represented by the depressed keys, to be entered into the machine for storage and subsequent totaling, as desired.

A plurality of capacitors 80–88 are connected across the contacts 55–59A and 55–59B for the purpose of spark suppression to protect the relay contacts with which they are associated. Resistors 90 and 91 serve to limit the discharge current of these capacitors again for the purpose of protecting the associated contacts. Also, a dropping resistor 94 limits the total current flowing from the D.C. voltage ilne 46 through the matrix 34 and the solenoid coils 25 and 26 of the adding machine.

Under certain conditions, an error may occur during the operation of the printer 14 which results in the printing of an erroneous ticket. An error may occur, for instance, upon a temporary power failure during the printing cycle. In such cases, an error signal is generated within the printer 14 for providing an operator with a visual indication of the occurrence of such an error so that the ticket can be discarded. The error signal of the printer 14 is applied by lead 95 to the control box 20 of this invention to prevent the entering of the information stored within the matrix 34. This is necessary since the operator will be required to repeat the weighing operation and the stored information would otherwise be recorded twice. The relays 50 and 51 are connected to the error signal lead 95 through an isolation diode 96 which prevents the +D.C. voltage of the line 46 from being applied to the error lead 95.

Upon the occurrence of an error voltage on the line 95 the relays 50 and 51 are held in their energized positions regardless of the opening of the relay 45 and the contact 45A. The relay 51 has a normally closed contact 51J in the lead connecting the relay contacts 55–58 to the D.C. voltage line 46. The occurrence of an error signal on the line 95 operates to hold the contact 51J open thereby preventing the sequential application of voltage to the solenoids 25 through the matrix 34, even though the sequence relays 55–59 will be operated by reason of the opening of the relay 45. However, with the contact 59B connected as shown to the "hot" side of the contact 51J, the add bar solenoid 26 of the adding machine 22 will be operated to cause the machine 22 to operate through one cycle of operation. Accordingly, an operator, examining the paper tape from the adding machine will recognize this as an error. If this is not desired, the contact 59B may be connected to the opposite side of the contact 51J so that no operation of the machine 22 results upon the occurrence of an error.

It is therefore seen that this invention provides a means and apparatus for reading out numerical information represented by individual closed contacts arranged in the form of a matrix. The sequencing relays are of positive operation and obviate the need for mechanical searching in the form of wipers or commutators. The invention has been adapted to the system of the above-named Allen application by its insertion within the connecting cable 16, and it may be readily removed and the halves of the cable replaced with a whole cable whenever an adding machine is not desired. The provision of the connectors 69 and 70 provide for the selection of either one of two modes of operation, permitting the accumulation of the running total of either weight or cost.

The adding machine of this invention need not be limited to any particular type so long as it is arranged for the mechanical input of digital information, in the manner described. For instance, it may be desired to utilize a machine which continuously presents a visual running total. Also, the machine may be provided with a manually operated summation bar which can be operated at the conclusion of the business period to cause the adding machine to print the total for that period. It is further understood that the invention may be used to record both price and weight information by reading out the total of the information stored in the matrix 34. This may be accomplished by two adding machines, or a single split-total machine, it being necessary to expand the function of the control box 20 by increasing the number of the sequentially operated relays 55–59 to operate the additional adding machine columns for the sequential recording of the additional information.

It is also understood that this invention is not limited to use with any particular monetary or weight system, it being only necessary that the contacts 35 or 36 in each of the groups of contacts or columns have corresponding keys on the keyboard of a suitable adding machine.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An automatic computing and recording scale system, comprising a weighing scale for supplying electrical weight information of an article thereon, a computer having a unit price input, said computer being connected to receive said weight information from said scale for combining with unit price, means in said computer forming an electric digital signal of the computed value of said article a labeler for printing and issuing a ticket of said value upon receipt of an enabling signal from said computer, an electrical circuit providing a connection between said computer and said labeler for transmitting said value signal and enabling signal to said labeler, an adding machine having individually operated electrical solenoid inputs for providing a record of the value of each article placed on the scale for which a ticket is issued, and electrical control means positioned in said circuit between said computer and said labeler and having switch means automatically operable in response to said enabling signal to apply said value signal to said adding machine inputs.

2. An automatic computing and recording scale system, comprising a weighing scale for supplying electrical weight information of an article thereon, a computer having a unit price input, said computer being connected to receive said weight information from said scale for combining with unit price forming an electric signal of the computed value of said article and forming a start signal through said circuit following the conclusion of computation for initiating said labeler cycle of operation, a labeler operable upon said start signal in a cycle of operation for printing and issuing a ticket of said value, an electrical circuit providing a connection between said computer and said labeler for transmitting said value and start signals to said labeler, an adding machine having individually operated electrical inputs for providing a record of the value of the articles placed on the scale for which a ticket is issued, and electrical control means positioned in said circuit between said computer and said labeler including connections to said adding machine inputs and automatically operable in response to said start signal to apply said value information to said adding machine inputs for the recording thereof on said adding machine concurrently with the printing and issuance of a label thereof by said labeler in said cycle of operation.

3. An automatic computing and recording scale system, comprising a weighing scale for supplying electrical weight information of an article thereon, a computer having a unit price input, said computer being connected to receive said weight information from said scale for combining with unit price and forming an electric signal of the computed value of said article, a labeler operable upon receipt of a start signal from said computer for printing and issuing a ticket of said value, an electrical circuit providing a connection between said computer and said labeler for transmitting said electrical value signal and start signal to said labeler, an adding machine having individually operated electrical inputs for providing a record of the value of each article placed on the scale for which a ticket is issued, electrical control means positioned in said circuit between said computer and said labeler and automatically operable in repsonse to said start signal having switch means to transfer said value information to said adding machine inputs following the application thereof to said labeler, means in said labeler signaling the occurrence of an error in the operation of the printing mechanism, and circuit means in said control means responsive to said error signal preventing the application of the value signal by said switch means from said computer to said adding machine inputs.

4. An automatic computing and recording scale system, comprising a weighing scale for supplying electrical weight information of an article thereon, a computer having an electrical unit price input and being connected to receive said weight information from said scale for combining with unit price forming an electric signal of said weight and the computed value of said article, a labeler for printing and issuing a ticket of said weight and value, an electrical cable providing a connection between said computer and said labeler for transmitting said electrical value signal to said labeler, an adding machine having individually operated electrical inputs for providing a record of the articles placed on the scale for which a ticket is issued, an electrical control circuit positioned in said cable between said computer and said labeler and automatically operable in response to the application of said signal to said labeler to transfer said signal to said adding machine input concurrently with the printing and issuing of a label thereof by said labeler, and means in said circuit providing selection between the application of said weight and said value signal to said adding machine.

5. An automatic weighing, computing and recording scale system, comprising a weighing scale operable to form an electric signal of the weight of an article placed thereon, a computer having a price input and being connected to receive said weight signal from said scale, means in said computer combining said weight signal and price input to form an electric signal of the value of said article and having means forming an enabling signal, a labeler connected to said computer for printing and issuing a ticket of said computed value upon the occurrence of said enabling signal of said computer, an adding machine having individually operable electric solenoid inputs for providing a record of each computation associated with each article placed on the scale for which a ticket is issued, and electrical control means connected to at least one of said computer and said labeler and having switch means automatically operable in response to said enabling signal to apply said value signal to said adding machine inputs.

6. The scale system of claim 5 further including means in said labeler signalling the occurrence of an error in the operation thereof, means applying said error signal to said control means, and circuit means in said electrical control means responsive to said error signal preventing the application of said value signal to said adding machine inputs.

7. The automatic scale system of claim 5 wherein a weight signal is applied to said labeler in addition to said value signal, means applying said weight and value signals to said electrical control means, and selector means providing selection between the application of said weight and said value to said adding machine.

References Cited in the file of this patent

UNITED STATES PATENTS

| | | |
|---|---|---|
| 1,335,067 | Malcher | Mar. 30, 1920 |
| 2,014,432 | Gerhold | Sept. 17, 1935 |
| 2,121,227 | Haegele | June 21, 1938 |
| 2,376,234 | Castro | May 15, 1945 |
| 2,497,784 | Mehan | Feb. 14, 1950 |
| 2,702,159 | Reppert | Feb. 15, 1955 |
| 2,761,620 | Lindesmith | Sept. 4, 1956 |
| 2,763,854 | Oliwa | Sept. 18, 1956 |
| 2,770,415 | Lindesmith | Nov. 13, 1956 |
| 2,793,806 | Lindesmith | Aug. 9, 1957 |
| 2,915,245 | Casanova et al. | Dec. 1, 1959 |
| 2,922,086 | Stidger | Jan. 19, 1960 |
| 2,948,464 | Allen | Aug. 9, 1960 |
| 2,954,512 | Hardison | Sept. 27, 1960 |
| 2,970,756 | Spesock | Feb. 7, 1961 |
| 3,044,563 | Gumpertz | July 17, 1962 |

FOREIGN PATENTS

| | | |
|---|---|---|
| 380,612 | Great Britain | Sept. 22, 1932 |
| 562,293 | Italy | Mar. 8, 1957 |
| 574,816 | Germany | Apr. 21, 1933 |

OTHER REFERENCES

Proceedings of Ass'n for Computing Machinery, Sept. 8–10, 1952, pages 133–141.